(12) United States Patent
Henke

(10) Patent No.: US 10,193,474 B2
(45) Date of Patent: Jan. 29, 2019

(54) ELECTRIC MOTOR VEHICLE AUXILIARY UNIT AND METHOD FOR COMMUTATING A MOTOR VEHICLE AUXILIARY UNIT

(71) Applicant: PIERBURG PUMP TECHNOLOGY GMBH, NEUSS (DE)

(72) Inventor: Toni Henke, Drebach (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 19 days.

(21) Appl. No.: 15/549,384

(22) PCT Filed: Feb. 10, 2015

(86) PCT No.: PCT/EP2015/052746
§ 371 (c)(1),
(2) Date: Aug. 8, 2017

(87) PCT Pub. No.: WO2016/128028
PCT Pub. Date: Aug. 18, 2016

(65) Prior Publication Data
US 2018/0034390 A1    Feb. 1, 2018

(51) Int. Cl.
*H02P 6/18* (2016.01)
*H02P 6/15* (2016.01)
(Continued)

(52) U.S. Cl.
CPC .................. *H02P 6/18* (2013.01); *H02P 6/15* (2016.02); *H02P 6/153* (2016.02); *H02P 6/16* (2013.01); *F01P 5/12* (2013.01); *F01P 2005/125* (2013.01)

(58) Field of Classification Search
CPC .... H02P 6/18; H02P 6/16; H02P 6/153; H02P 6/15
(Continued)

(56) References Cited

U.S. PATENT DOCUMENTS 5,367,234 A   11/1994   DiTucci
6,196,650 B1   3/2001   Inagaki
(Continued)

FOREIGN PATENT DOCUMENTS

DE   10 2007 012 669 A1   9/2008
JP       H08-116689 A    5/1996
(Continued)

*Primary Examiner* — Jorge L Carrasquillo
(74) *Attorney, Agent, or Firm* — Norman B. Thot

(57) ABSTRACT

An electric motor vehicle auxiliary unit includes an electronically commutated drive motor comprising motor coils and an electronic commutator arrangement which energizes the motor coils. The electronic commutator arrangement includes a control unit, multiple power semiconductors each of which is controlled by the control unit, a motor current path, a motor current tap arranged in a course of the motor current path, and a high-pass filter arranged between the motor current tap and the control unit. The motor current tap is arranged so that a voltage signal proportional to a motor current IM drops at the motor current tap during a motor energization. The high-pass filter includes an input signal and an output signal. The input signal is the voltage signal and the output signal is a control signal for the control unit. The high-pass filter triggers a pole reversal after a delay following an input of a peak signal.

13 Claims, 2 Drawing Sheets

(51) Int. Cl.
*H02P 6/16* (2016.01)
*F01P 5/12* (2006.01)
(58) Field of Classification Search
USPC .............................. 318/3, 142, 400.1, 400.13
See application file for complete search history.

(56) References Cited

U.S. PATENT DOCUMENTS

| | | | |
|---|---|---|---|
| 2009/0049463 A1 | 2/2009 | Ueda | |
| 2009/0261732 A1 | 10/2009 | Bouchard | |
| 2010/0033064 A1* | 2/2010 | Tanaka | G01B 7/30 310/67 R |
| 2010/0235047 A1 | 9/2010 | Kurishige et al. | |
| 2010/0289387 A1 | 11/2010 | Tanaka et al. | |
| 2011/0037416 A1 | 2/2011 | Nakamura | |
| 2012/0217849 A1* | 8/2012 | Aoki | H02P 6/18 310/68 D |
| 2013/0033214 A1* | 2/2013 | Obata | G01R 31/1227 318/490 |

FOREIGN PATENT DOCUMENTS

| | | |
|---|---|---|
| JP | 2000-102283 A | 4/2000 |
| JP | 2004-298000 A | 10/2004 |
| JP | 2008-163904 A | 7/2008 |
| JP | 2011-147343 A | 7/2011 |
| JP | 2012-178950 A | 9/2012 |
| WO | WO 2007/097424 A1 | 8/2007 |
| WO | WO 2009/130808 A1 | 10/2009 |

* cited by examiner

ELECTRIC MOTOR VEHICLE AUXILIARY UNIT AND METHOD FOR COMMUTATING A MOTOR VEHICLE AUXILIARY UNIT

CROSS REFERENCE TO PRIOR APPLICATIONS

This application is a U.S. National Phase application under 35 U.S.C. § 371 of International Application No. PCT/EP2015/052746, filed on Feb. 10, 2015. The International Application was published in German on Aug. 18, 2016 as WO 2016/128028 A1 under PCT Article 21(2).

FIELD

The present invention relates to an electrical motor vehicle auxiliary unit with an electronically commutated drive motor and to a method for commutating the drive motor. The present invention in particular, but not exclusively, relates to motor vehicle pump units, in particular to liquid pumps, and more particularly to so-called "water circulating pumps".

BACKGROUND

For an electronic commutation of a drive motor, the control unit controlling the commutation must have rotor position information in order to be able to cause a respective inversion of the direction of current flow to the stator coils at the correct time. One or a plurality of sensors may be provided for the detection of the rotor position information, such as Hall sensors responsive to magnetic fields, which detect the passing magnetic field of the permanent magnetic motor rotor or of a separate sensor magnet.

It is preferred for cost reasons not to provide a separate sensor, if possible. During forced pauses of current supply to the motor, a so-called sensorless rotor position detection may be provided by evaluating the induction voltage, the so-called EMF, induced in the stator coils by the permanent magnetic rotor, and to conclude the rotor position based on the time sequence of the induction voltage. However, this method requires a substantial computational capacity of the control unit. This method is further only suitable with small inductivities, since large inductivities require a very long pause in current supply in order to observe an interference-free EMF induction voltage. In particular with small electric drive motors for smaller motor vehicle auxiliary units, such as, for example, water circulating pumps, high inductivities are also common, for example, for physical reasons, so that this method is not suited for small drive motors.

SUMMARY

An aspect of the present invention is to provide an electrical motor vehicle auxiliary unit having an electronically commutated drive motor, as well as a method for controlling the electronically commutated drive motor, which have a simple structure and which require little computational effort in the control unit.

In an embodiment, the present invention provides an electric motor vehicle auxiliary unit which includes an electronically commutated drive motor comprising motor coils and an electronic commutator arrangement configured to energize the motor coils. The electronic commutator arrangement comprises a control unit, multiple power semiconductors each of which is configured to be controlled by the control unit, a motor current path, a motor current tap arranged in a course of the motor current path, and a high-pass filter arranged between the motor current tap and the control unit. The motor current tap is arranged so that a voltage signal proportional to a motor current IM drops at the motor current tap during a motor energization. The high-pass filter comprises an input signal and an output signal. The input signal is the voltage signal and the output signal is a control signal for the control unit. The high-pass filter is configured so that, following an input of a peak signal, a pole reversal is triggered after a delay.

BRIEF DESCRIPTION OF THE DRAWINGS

The present invention is described in greater detail below on the basis of embodiments and of the drawings in which.

DETAILED DESCRIPTION

Figure 1:
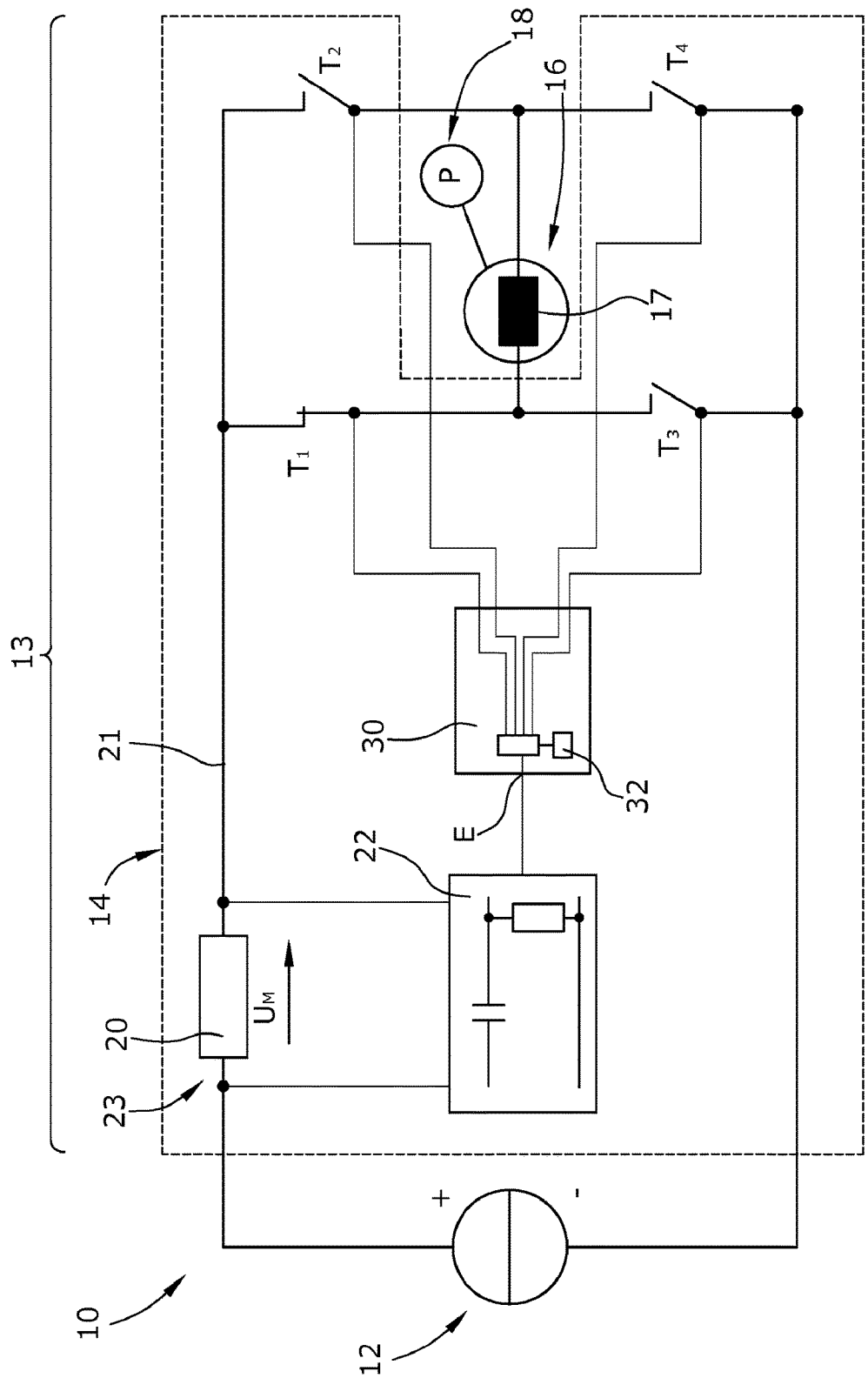
FIG. 1 shows a schematic illustration of an electrical motor vehicle auxiliary unit with an electronically commutated drive motor.

The motor vehicle auxiliary unit has a motor current tap along the motor current path, at which tap a voltage signal proportional to the motor current $I_M$ drops during the supply of current to the motor. Seen in the direction of current flow, the motor current tap may be arranged upstream of the power semiconductors controlled by the control unit and connecting the supply voltage through to the motor coils, although, as an alternative, the tap may also be arranged downstream of the semiconductors. An equivalent of the entire electric power is detected at the motor current tap which flows to the motor coil(s) via the power semiconductors. The voltage signal drops at the motor current tap, which voltage signal is the input signal to an electric high-pass filter arranged electrically between the motor current tap and the control unit. The voltage signal $U_M$ proportional to the motor current $I_M$ is differentiated in a mathematical sense by the high-pass filter so that the output signal of the high-pass filter substantially shows steep motor current strokes in the form of peak signals, while showing few or no flat motor current strokes and DC voltage portions.

With respect to the time sequence of the motor current during rotation of the motor rotor, a peculiarity occurs at each pole reversal of the motor rotor, i.e., at the moment when a rotor pole stands about halfway between two stator teeth. The induction voltage of the relevant stator coils is particularly low at this moment so that the motor current of the relevant stator coils rises abruptly because of the low counter EMF. This abrupt rise in motor current is output as a high peak signal in the high-pass filter output signal.

The output signal of the high-pass filter is a control signal for the control unit which, after a peak signal has been received, triggers the subsequent polarity reversal after a fixed or a variable delay dt which may also be zero. The control unit thus uses the pole reversal peak signal to trigger the subsequent polarity reversal after a fixed or a variable delay dt, which may also be zero. The high-pass filter signal may be read into the control unit without computational effort using a threshold value input.

The control unit does not have to evaluate and interpret the signal from the high-pass filter, and detect and evaluate a rise, since the load situation of the drive motor is no longer included in the output signal of the high-pass filter. The control unit is thus completely freed from evaluation tasks with respect to the high-pass filter output signal. A processor with a relatively low computing capacity or cycle frequency may therefore generally be used for the control unit. The high-pass filter may be realized in a very simple and economic manner in analog technology by a so-called RC element.

Further rotor position sensors may also be provided via which redundancy is improved and/or the direction of rotation is detected.

In an embodiment of the present invention, the drive motor can, for example, be of a single phase design so that all motor coils are connected in series one after the other and with alternating winding directions. The drive motor may also be of a three-phase design.

In an embodiment of the present invention, the high-pass filter can, for example, have a cut-off frequency of more than 80 Hz, for example, of more than 120 Hz. A typical cut-off frequency for a high-pass filter of the present invention is about 200 Hz.

The high-pass filter can, for example, be supplemented by a low pass filter to form a band pass filter. Due to the additional low pass filter (which may, for example, have a cut-off frequency of 2,000 Hz to 20,000 Hz), interference signals which could interfere with the control during the detection of the pole reversal peak signal are in particular filtered out.

In an embodiment of the present invention, the control unit can, for example, comprise a dead time element, which is generally software or a timer unit, by which, after detection of a pole reversal signal peak, the input signal is blanked out for a dead time $t_T$ that is longer than the delay dt between the pole reversal signal peak and the subsequent polarity reversal. When a polarity reversal occurs, the polarity of the motor current changes abruptly so that a signal peak is generated at the output of the high-pass filter which, however, is not caused by the pole reversal, but by the polarity reversal of the motor current. Since a polarity reversal signal peak must not be interpreted as a pole reversal signal peak, the dead time $t_T$ is always set so that the polarity reversal signal peak following a pole reversal signal peak cannot be erroneously identified as a pole reversal signal peak or a commutator trigger signal. Setting a dead time in the control unit only requires little computational power so that the control unit is not burdened thereby and/or a control unit with relatively low computational power can be used.

In an embodiment of the present invention, the dead time can, for example, be variable and be between 20% and 60% of the previous commutation interval, in particular between 30% and 50%. Setting and calculating a relative dead time that results proportionally from the duration of the previous commutation interval also only requires relatively little computational effort in the control unit. The dead time may be determined in dependence on the moment of inertia of the rotor.

The motor current tap may be designed as a low-resistance series resistor arranged in the motor current path, i.e., it may be designed as a so-called shunt. The motor current tap can, for example, be formed by a semiconductor, in particular by a reverse polarity protection semiconductor, especially if it is present anyway.

The present invention also provides a method for commutating a motor vehicle auxiliary unit with the following two method steps.

First, the control unit triggers a polarity reversal after the delay dt has elapsed after the arrival of the pole reversal signal peak. The control unit input signal is at the same time blanked out, i.e., ignored, for the duration of the dead time $t_T$.

The delay dt and the dead time $t_T$ can, for example, be determined in dependence on the duration of the previous commutation interval $T_K$, for example, by a constant proportioning.

An embodiment of the present invention will be described below under reference to the drawings.

FIG. 1 schematically shows an arrangement 10 formed by a vehicle battery 12 and an electrical motor vehicle auxiliary unit 13 having an electronically commutated dive motor 16. The drive motor 16 is commutated by an electronic commutator arrangement 14 and drives a mechanical pump part 18. The electric motor vehicle auxiliary unit 13 may, for example, be a so-called water circulating pump having an electric power of less than 100-200 W. Low-voltage drive motors typically have a high inductivity of the motor coils 17 of the drive motor 16. The electric motor vehicle auxiliary unit 13 or the drive motor 16 is electrically connected to the vehicle battery 12, wherein a vehicle control may intervene between the vehicle battery 12 and the electric motor vehicle auxiliary unit 13 to switch the electric motor vehicle auxiliary unit 13 on and off as needed.

Connecting an on-board voltage of, for example, 12V, as provided by the vehicle battery 12, to the motor coils 17 is effected through four power semiconductors $T_1$ to $T_4$ arranged in a so-called H-bridge, via which the energizing of the motor coils 17 can be reversed in polarity, i.e., the direction of energizing of the motor coils 17 can be switched over or reversed. The motor coils 17 are arranged in a single phase, i.e., they are connected in series with each other. The four power semiconductors $T_1$ to $T_4$ are driven, i.e., opened and closed, by a control unit 30 so that two respective power semiconductors $T_1$, $T_4$ arranged diagonally with respect to each other are open and the other two power semiconductors $T_2$, $T_3$ are closed.

In the course of a motor current path 21, the electronic commutator arrangement 14 comprises a motor current tap 23 in the form of a motor current tap semiconductor 20 at which, due to its ohmic resistance, a voltage signal $U_M$ drops that is proportional to the motor current N. The motor current tap semiconductor 20 may, for example, be a reverse polarity protection semiconductor or transistor.

The voltage signal $U_M$ provided by the motor current tap 23 is the input signal to a high-pass filter 22 which is configured in analog circuit technology as a high-pass filter having a cut-off frequency of about 200 Hz. The output signal of the high-pass filter 22 is an input signal E of the control unit 30. The high-pass filter 22 forms a differentiating element that differentiates the time course of the voltage signal $U_M$.

Figure 2:
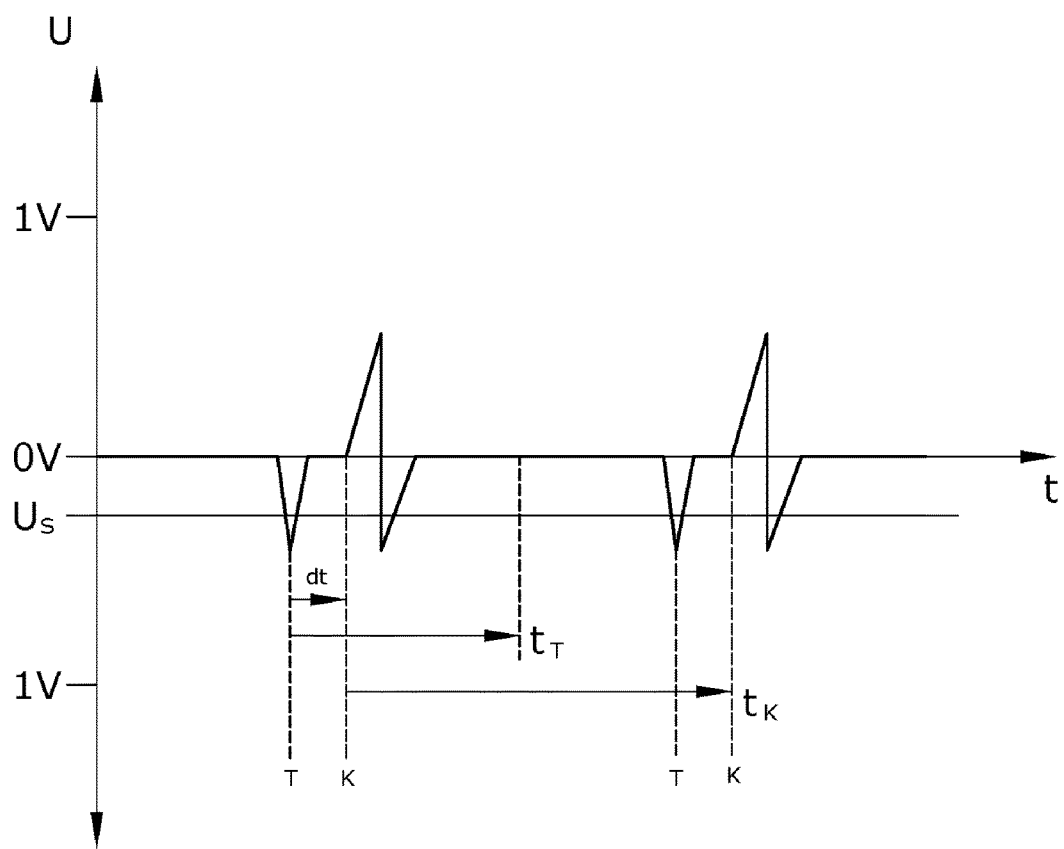
FIG. 2 shows a voltage profile of the high-pass filter output signal or the control unit input signal of the commutator arrangement of the drive motor illustrated in FIG. 1.

The output signal of the high-pass filter 22 or the input signal E of the control unit 30 is shown in the time course in FIG. 2. The first downward directed peak signal T is caused by the motor current $I_M$ and the voltage signal $U_M$ proportional thereto rising abruptly when a rotor pole or all rotor poles of the motor rotor stand approximately halfway between two stator poles of the motor stator. This peak signal is thus a very exact and secure indication of a pole reversal which, in the present context, means the constellation in which a respective rotor pole stands between two stator poles. The control unit 30 blanks out all input signals between 0 V and a threshold voltage $U_S$.

The pole reversal peak signal T is interpreted by the control unit 30 as a polarity reversal trigger signal. The control unit 30 causes the subsequent polarity reversal K with a delay dt as soon as the pole reversal peak signal T has been detected by the control unit 30 as an allowable trigger signal.

The control unit 30 comprises a dead time element 32 which blanks out the input signal E for the duration of a dead time $t_T$ after the pole reversal peak signal has been detected. The dead time $t_T$ must be longer than the delay dt and is, for example, constantly 40% of the commutation interval $t_K$ last calculated by the control unit 30.

The input signal E is blanked out during the dead time $t_T$, i.e., it is ignored. The polarity reversal peak signals generated by the polarity reversal, which occur shortly after the delay dt and are caused by the polarity reversal, are thereby ignored and cannot be erroneously interpreted as a pole reversal peak signal.

The present invention is not limited to embodiments described herein; reference should be had to the appended claims.

The invention claimed is:

1. An electric motor vehicle auxiliary unit comprising:
   an electronically commutated drive motor comprising motor coils; and
   an electronic commutator arrangement configured to energize the motor coils, the electronic commutator arrangement comprising:
      a control unit,
      multiple power semiconductors each of which is configured to be controlled by the control unit,
      a motor current path,
      a motor current tap arranged in a course of the motor current path, the motor current tap being arranged so that a voltage signal proportional to a motor current $I_M$ drops at the motor current tap during a motor energization, and
      a high-pass filter arranged between the motor current tap and the control unit, the high-pass filter comprising an input signal and an output signal, the input signal being the voltage signal and the output signal being a control signal for the control unit, the high-pass filter being configured so that, following an input of a peak signal, a pole reversal is triggered after a delay.

2. The electric motor vehicle auxiliary unit as recited in claim 1, wherein the electronically commutated drive motor is provided as a single-phase design or as a three-phase design.

3. The electric motor vehicle auxiliary unit as recited in claim 1, wherein the high-pass filter further comprises a cut-off frequency of more than 80 Hz.

4. The electric motor vehicle auxiliary unit as recited in claim 1, wherein the high-pass filter further comprises a cut-off frequency of more than 120 Hz.

5. The electric motor vehicle auxiliary unit as recited in claim 1, further comprising:
   a low-pass filter configured to supplement the high-pass filter,
   wherein,
   the high-pass filter and the low pass filter together form a band-pass filter.

6. The electric motor vehicle auxiliary unit as recited in claim 1, wherein the control unit comprises a dead time element which is configured, after a detection of the peak signal, to blank out the input signal for a duration of a dead time that is longer than the delay until the pole reversal is triggered.

7. The electric motor vehicle auxiliary unit as recited in claim 6, wherein the dead time is between 20% and 90% of a commutation interval.

8. A method for commutating the electric motor vehicle auxiliary unit as recited in claim 6, the method comprising:
   triggering a polarity reversal with the control unit when the delay has elapsed after a detection of a trigger signal; and
   blanking out a control unit input signal for the duration of the dead time.

9. The method as recited in claim 8, wherein the delay and the dead time are determined in dependence on a duration of a previous commutation interval.

10. The electric motor vehicle auxiliary unit as recited in claim 1, wherein the electric motor auxiliary unit is a liquid pump.

11. The electric motor vehicle auxiliary unit as recited in claim 10, wherein the liquid pump is a water circulating pump.

12. The electric motor vehicle auxiliary unit as recited in claim 1, wherein the motor current tap is formed by a semiconductor.

13. The electric motor vehicle auxiliary unit as recited in claim 1, wherein the motor current tap is formed by a reverse polarity protection semiconductor.

* * * * *